Nov. 26, 1957　　　R. A. FRYKLUND　　　2,814,548
DEPTH SOUNDER RECORDERS
Original Filed Oct. 6, 1949　　　2 Sheets-Sheet 1

INVENTOR
ROBERT A. FRYKLUND
BY Elmer J. Gorn
ATTORNEY

Nov. 26, 1957  R. A. FRYKLUND  2,814,548
DEPTH SOUNDER RECORDERS
Original Filed Oct. 6, 1949  2 Sheets-Sheet 2

INVENTOR
ROBERT A. FRYKLUND
BY Elmer J. Gorn
ATTORNEY

# United States Patent Office 2,814,548
Patented Nov. 26, 1957

2,814,548

DEPTH SOUNDER RECORDERS

Robert A. Fryklund, Dedham, Mass., assignor to Raytheon Manufacturing Company, Newton, Mass., a corporation of Delaware Original application October 6, 1949, Serial No. 119,905, now Patent No. 2,715,055, dated August 9, 1955. Divided and this application October 28, 1952, Serial No. 317,329

3 Claims. (Cl. 346—139)

This application is a division of my application Serial No. 119,905, filed October 6, 1949, and now Patent No. 2,715,055.

This invention relates to record making mechanisms for depth sounding devices of the pulse-echo type, and is particularly concerned with improved, compact, and inexpensive mechanisms which can be housed in a common container with electronic transmitter and receiver amplifier elements. The recorder of the invention is of the type employing a record making medium in sheet form having two layers, one of which is electrically conductive and one of which is electrically nonconductive, the medium being marked upon by means of an electrically conductive stylus in contact with the nonconductive layer and suitable electrical potential applied between the stylus and the conductive layer. The stylus is borne on an endless belt which is so disposed with relation to a platen bearing the medium that the stylus makes repeated traverses of the medium when pulley wheels supporting the belt are rotated.

In accordance with the present invention, a pair of pulleys, mounted on the platen, bears a lightweight, cable-type endless belt, which in turn bears one or more styluses in an improved manner such that each traverse of a stylus across the paper is in an accurately controlled straight-line path, without a sidewise wobble, or variation in pressure upon the medium. Adjustment and assembly of these parts are simplified to an unexpected degree. Keying of the transmitter is effected by the same belt, the adjustment of the zero position being effected in a novel fashion which also is greatly simplified and accurate.

The foregoing and numerous other features and advantages of the invention will appear from the following detailed description of an embodiment thereof, reference being made to the accompanying drawings wherein.

Figure 1:
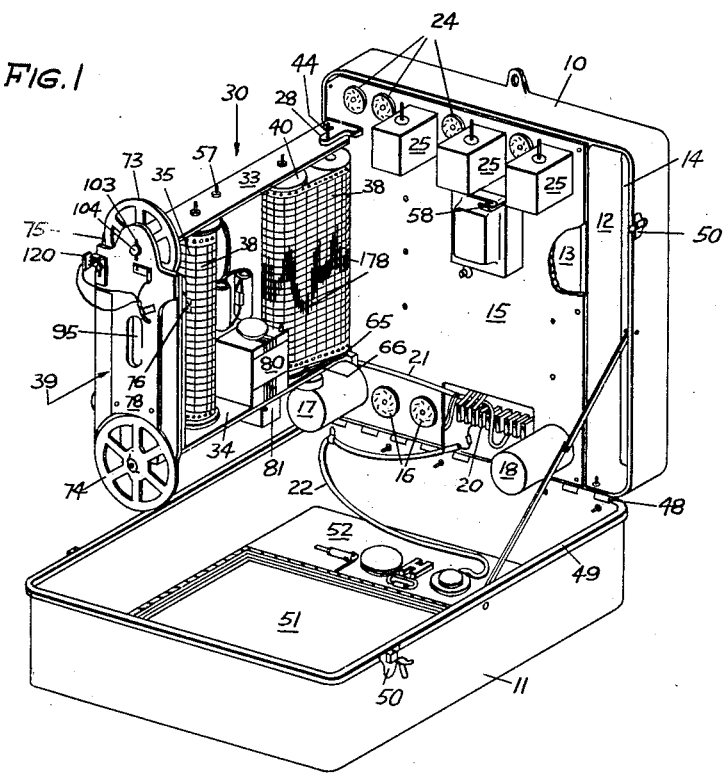
Fig. 1 is an isometric view showing the recorder with parts open, as for servicing or inspection.
Figure 2:
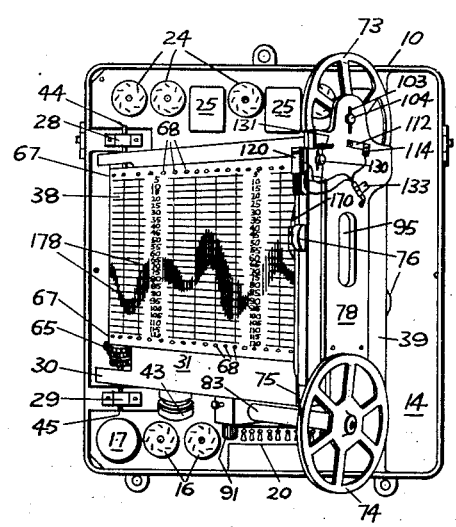
Fig. 2 is a front view of the recorder of Fig. 1 with the cover removed and the platen partly open.
Figure 3:
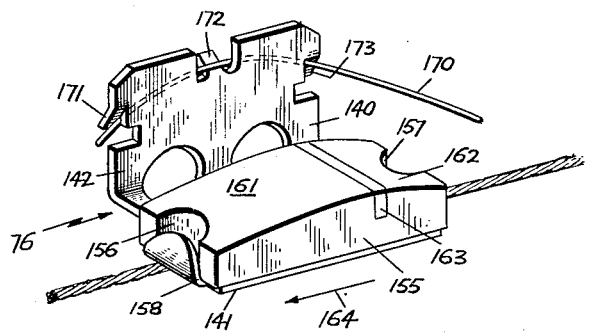
Fig. 3 is an enlarged top quarter view of the marking and switching assembly.
Figure 4:
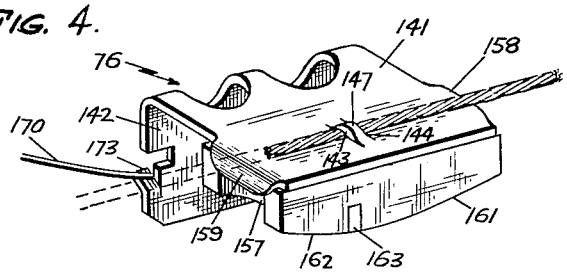
Fig. 4 is a bottom quarter view of Fig. 3.

Referring now to Figs. 1 and 2, the recorder is housed in a case which is in two parts comprising a base 10 and a cover 11. The base 10 is preferably made of a rigid material, such as cast aluminum, and has sides which are sufficiently high to provide a substantial volume therein, for the purpose to be described. A partition 12, which is preferably cast integrally with the base 10, divides the base volume into a major part 13 and a minor part 14. A cover 15 covers the major volume 13 and furnishes a support for electronic components. Thus, along the bottom portion of the cover 15, as seen in Fig. 1, there are tube sockets 16 and containers 17 and 18, which may house condensers and the like, comprising the transmitting equipment of the complete depth sounding system. A portion of the lower edge of the cover 15 is cut away to provide access to terminals 20 for the connection of various electrical cables 21 and 22, for example, used in assembling the system. At the upper edge of the cover 15, as seen in Fig. 1, are found tube sockets 24 and tuning transformers 25 of the receiving and amplifying circuit of the system. In addition to the foregoing, many electrical components, such as resistors, capacitors and inductors, which do not appear in Fig. 1, are mounted on the underside of the cover 15 and housed in the major volume 13. As will appear below the minor volume 14 is employed to house a portion of the record making mechanism.

At the lefthand edge of the base 10 are two hinges 28 and 29 which are rigidly attached thereto. A platen 30 is mounted to the base 10 by means of these hinges. The platen 30 comprises a sheet of electrically conductive material, such as iron or steel, which provides a planar surface 31 and top and bottom flanges 33 and 34, disposed rectangularly thereto. A supply roll 35, which furnishes record medium 38, is mounted between the top and bottom flanges 33 and 34, beneath the plane portion 31 near the right-hand edge thereof. This roll is free turning, except for a friction spring 36, mounted to the underside of the plane member 31 which engages the supply of record medium 38 and prevents the roll from spinning freely. A take-up roll 40 is mounted between the flanges 33 and 34 intermediate the right and lefthand edges of the plane portion 31. A drive roll 42 is mounted between the flanges 33 and 34 at the lefthand edge of the plane portion 31, and driven by a small motor 43 which is mounted on the underside of the lower flange 34. The axis of rotation of the drive roll 42 is the hinge axis of the platen, and extensions 44 and 45 of this axis are journaled in the hinges 28 and 29, respectively, to support the platen 30 from the base 10. A record making assembly 39, which includes stylus and switch devices as will be explained below, is mounted at the righthand end of the platen 30. For this purpose the top and bottom flanges 33 and 34 are continued beyond the plane portion 31 of the platen and bent downwardly and upwardly to provide rectangularly disposed ends 54 and 55, respectively. The record making assembly 39 lies generally in a plane which is perpendicular to that of the plane portion 31 of the platen, and reposes at least in part in the minor volume 14 of the base 10 when the platen assembly 30 is closed. In the closed position a projection 57 on the upper flange 33 engages a spring catch 58 which is mounted on the cover 15, and hence affixed to the base 10, and is thereby locked.

The cover 11 of the recorder case is hingedly attached to the lower forward horizontal edge of the base 10, as seen in Fig. 1. The cover 11 need not be made of rigid material, but can be drawn from one sheet of aluminum, for example. However, it is preferred to employ a piano hinge 48 to attach the cover to the base, in order to provide rigidity to the cover. A rubber gasket 49 is affixed to the side and top edges of the cover and latches 50 of the suitcase type hold the cover closed tightly against the base with the gasket in compression, thereby furnishing a splash-proof enclosure for the recorder mechanism and electronic parts. A window 51 is provided in the cover 11, through which the record medium 38 may be viewed when the cover is closed. This window is supported in a rubber mounting grommet 53 which relieves the window of shocks which may be incident upon the cover 11. The cover 11 also bears an assembly of switches, generally designated at 52, for controlling the various functions of the system.

Figure 5:
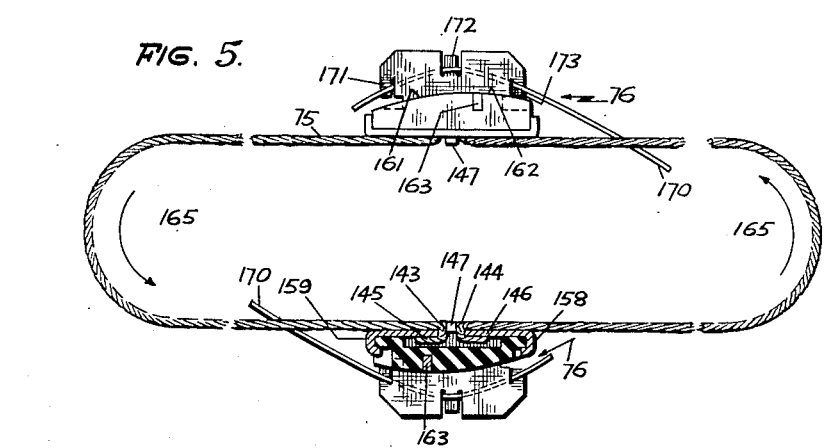
Fig. 5 is a side view partly in section of the assembled belt mechanism.
Figure 6:
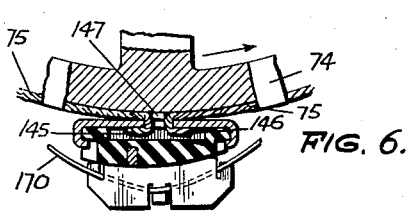
Fig. 6 is a fragmentary view illustrating a feature of the belt assembly.

Referring now to Figs. 3 through 6, inclusive, the stylus and switch assembly consists of a metallic sheet, such as stainless steel, which is formed into a bracket 140 having a base or bottom portion 141 and a rectangularly disposed side portion 142. The bottom portion 141 is provided with two holes 143 and 144, seen in Figs. 4 and 5. The cable 75 is a multistrand metallic cable, of any suitable material, and, as shown in Fig. 5, is provided with two stylus and switch assemblies 76, although it might be constructed with one such assembly if desired. The cable is attached to the bottom portion 141 of the bracket 140 by inserting the free ends 145 and 146 into the holes 143 and 144, respectively, and bending them back to form U-shaped ends of which the bights confront each other. The cable in this position is preferably treated with a solder which binds the strands together at the bights in order that the strain upon the strands may be uniformly distributed. The U-shaped ends of the cable are not, however, soldered to the material of the bracket 140, but rather cooperate therewith in the manner of links of a chain. The material of the bottom portion 141 intermediate the holes 143 and 144 is struck outwardly at 147 so that it rests between the legs of the U-shaped ends of the cable which continue on into the main body of the cable. This bent-out portion 147 prevents the cable ends from becoming disengaged from the base portion 141, and at the same time permits free chain-like action. It is the bottom or base portion 141 of the stylus and switch assembly which slides on the platform 135 of the foundation member 78, while the cable 75 and struck out portion 147 move in the groove 136. In order to provide that the bottom portion 141 will be maintained in contact with the platform 135, the platform 135 is elevated above the plane which contains a line which is tangent to both pulleys 73 and 74; that is, the plane of the platform 135 is further away from a line joining the centers of the two pulleys than the plane containing a line which is tangent to the two pulleys. For this purpose the ends of the platform 135 are sloped slightly at 150. This arrangement provides also for the possibility that the stylus and switch assembly, in its circular flight around the pulleys, will tend to fly off the pulleys by centrifugal force. If it is attempted to urge the stylus and switch assembly to follow a line which is tangent to the two pulleys in its passage between the two pulleys, it is necessary to overcome this centrifugal tendency, which would introduce a variation in pressure of the stylus and switch assembly upon the platform 135. This in turn causes uneven recording. In the present invention, the stylus and switch assembly is permitted a sufficient degree of centrifugal freedom to overcome this defect. Another advantage of the structure thus far described is that, by virtue of the closeness of the holes 143 and 144 and the chain-like construction employed in assembling the cable to the base 141, the stylus and switch assembly moves around the pulleys 73 and 74 without tending to lift the cable 75 from the periphery of the pulleys, as is apparent from Fig. 6. To this end the peripheral grooves in the pulleys are preferably not greater in depth than the diameter of the cable 75, as deeper peripheral grooves cause the base 141 to be lifted from the cable.

The base or bottom portion 141 of the bracket 140 carries a block 155 of electrically nonconductive material, which in the present embodiment is, for reasons that will appear, preferably nylon or the like. The block 155 is rectangular in plan and is provided with indented portions 156 and 157 at its ends. The base portion 141 is provided with extensions 158 and 159 which are bent up and over block 155 to repose in the indented portions 156 and 157, respectively, and thereby clamp the block firmly to the base. The upper surface of the block 155 is humped intermediate the ends thereof, having a long sloping surface 161 and a surface of shorter slope 162.

At the top of the hump between the sloped surfaces 161 and 162 there is embedded in the block 155 a strip of electrically conductive material 163, disposed transversely to the long dimension of the block, and lying flush with the top surface. The direction of motion of the assembly 76 is as indicated by the arrow 164 in Fig. 3, the pulleys 73 and 74 being rotated as indicated by arrows 165 in Fig. 5. The block 155 is thus moved to bring the long sloping surface 161 in contact with switch contacts 121 and 122 of switch 120 when the pulley 74 is rotated. Since nylon has lubricating properties, it is preferred for this use. The electrically conductive bar 163 momentarily bridges the contacts 121 and 122 to close the switch 120, the instant of bridging being adjusted by means of a slotted aperture and a hand nut. The lugs 124 and 125 of switch 120 are wired to the electronic transmitter circuit, which, although not shown herein, may be of many kinds well-known to the those skilled in the art. Such circuits are ordinarily keyed or pulsed by momentarily closing a pair of contacts such as contacts 121 and 122, with a shorting bar such as bar 163. As will be appreciated from Fig. 2, the switch 120 is properly disposed for adjusting the zero position of the record medium 38.

The stylus and switch assembly 76 carries also the marking stylus 170 which marks the record medium 38. The side portion 142 of the bracket 140 is provided with three lugs 171, 172, and 173, which are struck out from the body thereof. Lugs 171 and 173 are downwardly directed and bent outwardly while lug 172 is upwardly directed but also bent outwardly. The stylus 170 consists of a suitable length of a relatively stiff electrically conductive wire, such as tungsten, for example, which is looped over the intermediate lug 172 and hooked under the end or outer lugs 171 and 173. This simple arrangement bends the stylus wire against its own desire to remain straight and firmly holds the stylus 170 in place and at the proper angle for establishing a sliding contact with the record medium 38. This stylus mounting structure is claimed in application Serial No. 121,209, filed October 13, 1949, now Patent No. 2,627,516. As will be appreciated from Fig. 3, in particular, the angle of the stylus 170 is such that the stylus may be easily drawn across the record medium 38 in the manner of a pencil sloping at the proper angle for smooth writing on paper without tearing the paper. The length of the stylus 170 is readily adjustable by the simple expedient of sliding the stylus in its holder, lugs 171, 172, and 173.

The deflection of the stylus 170 from its normal path by the straight edge 175 does not pull the stylus and switch assembly 76 laterally out of its normal path for the reason that the groove 136 holds the belt 175 and projection 147 against such lateral motion. Nor does this deflection of the stylus cause the stylus and switch assembly to wobble on the platform 135 for, as has already been explained, this platform is so placed that the assembly 76 is held tightly to the platform by the tension on the cable 75. This tension can be adjusted with the hand nut 104 cooperating with the slotted aperture 103 in the foundation member 78. This tension also provides that the stylus and switch assembly 76 will cause the stylus to bear uniformly on the record medium 38 as it travels across it, thereby assuring that the density of the markings 178 is uniform as far as the pressure of the stylus is concerned.

As the lower pulley 74 is rotated, the stylus makes repeated and somewhat rapid traverses of the record medium 38. However, each such traverse brings the stylus first in contact with the nose piece 70 of the platen 30. The pulleys 73 and 74 are made of an electrically conductive material, and the cable 75 is likewise electrically conductive. Signals from the receiver are applied to the upper pulley 73 via lug 114 and the brush 110, proceeding thence via the cable 75 of the bracket 140 to the stylus 170. The platen 30 is the other terminal as far as the signal voltage is concerned, and the electrically conductive layer of the record medium 38 rests on the plane portion 31 thereof. Thus the signal voltage is applied across the electrically nonconductive layer of the record medium 38 between the stylus 170 and the plane portion 31 of the platen. If the nose piece 70 of the platen is electrically conductive and a signal voltage appears between the stylus and the platen at the instant the stylus comes in contact with the nose piece and prior to the instant at which it arrives on the record medium 38, it is possible that the tip end of the stylus will become welded to the platen and thereby either pull the stylus from its holder entirely or displace it in the holder. The position of the stylus in the holder must, of course, be determined with care so that the markings 178 will provide an accurate measure of distance or depth. The provision of an electrically nonconductive nose piece 70 prevents such welding, or indeed any sparking which tends to injure the stylus. The electrically conductive layer which is part of the record medium 38 is sufficiently conductive to provide an electrical extension of the platen to the point of contact with the stylus.

It will be appreciated that many variations of the features shown and described herein in connection with the single embodiment of the invention illustrated will occur to those who are skilled in the art to which the invention relates. It is, therefore, intended that the claims which follow shall not be limited by the particular details of the illustrated embodiment but rather by the prior art.

What is claimed is:

1. In recorder apparatus of the kind comprising pulley wheels and an endless belt or the like engaging said wheels and carrying a recording stylus, a multistrand cable engaging said wheels, a stylus carrier having a pair of closely adjacent holes, the ends of said cable being linked one in each of said holes and bent back over the carrier material so that the free ends are oppositely directed and the bights confront each other, the material of said carrier between said holes being deflected away from said free ends and toward the main body of the cable to lie substantially in the line of said main body, the distance between said holes being such with relation to the size of said wheels that said carrier moves over said wheels without substantially lifting said cable from the wheels.

2. In recorder apparatus of the kind comprising pulley wheels and an endless belt or the like engaging said wheels and carrying a recording stylus, a multistrand cable engaging said wheels, a stylus carrier having a pair of closely adjacent holes, the ends of said cable being linked one in each of said holes and bent back over the carrier material so that the free ends are oppositely directed and the bights confront each other, the material between said holes being deflected away from said free ends and toward the main body of the cable to lie substantially in the line of said main body, and means solidly bonding the strands of said cable to each other in the carrier engaging regions of the ends thereof.

3. In recorder apparatus of the kind comprising pulley wheels and an endless belt or the like engaging said wheels and carrying a recording stylus, a cable engaging said wheels, a flat member having a pair of closely adjacent holes, the ends of said cable being linked one in each of said holes with said cable lying on one side of said member, a block of electrically insulating material, means supporting said block at the other side of said member, a strip of electrically conductive material mounted in said block, and stylus carrying means mounted at one edge of said flat member.

References Cited in the file of this patent
UNITED STATES PATENTS

| | | |
|---|---|---|
| 1,452,122 | McConnell | Apr. 17, 1923 |
| 2,008,970 | Spitzglass | July 23, 1935 |
| 2,464,970 | Finch | Mar. 22, 1949 |
| 2,520,918 | Elarde | Sept. 5, 1950 |
| 2,627,448 | Horton | Feb. 3, 1953 |
| 2,633,405 | Nelson | Mar. 31, 1953 |